United States Patent Office 3,446,713
Patented May 27, 1969

3,446,713
SEPARATION OF THE CORE OF A URANIUM FUEL ELEMENT FROM ITS ENVELOPE
Samuel Raviv, Beer-Sheva, Elsa Rabinovitz, Dimona, and Shimon Malkiely, Beer-Sheva, Israel, assignors to The State of Israel, Ministry of Defence, Hakiria, Tel-Aviv, Israel
No Drawing. Filed Sept. 26, 1967, Ser. No. 670,783
Int. Cl. B01k *3/00;* C01g *43/00*
U.S. Cl. 204—1.5                     3 Claims

ABSTRACT OF THE DISCLOSURE

Separation of the core of a uranium fuel element with free exposed ends from its envelope by connecting the core as cathode into an electrolytic circuit in which the electrolyte is 7 to 12N nitric acid. The electrolysis is conducted until the core is loosened from the envelope whereupon it is extracted.

---

The present invention concerns a method for the separation of the core of a uranium fuel element from its envelope.

Uranium fuel elements comprise a core of pure uranium, a uranium compound or a uranium alloy and an envelope which conventionally is of aluminium, aluminium alloy, zirconium, zirconium alloy or stainless steel. In the course of the nuclear reactions occurring within the reactor, the uranium is gradually fissioned and after a certain time the concentration of the fission products in the fuel elements increases to such an extent that the elements are spent and have to be replaced. Spent uranium fuel elements are highly radioactive and their disposal constitutes a serious problem.

It is customary to dispose of spent uranium fuel elements by dissolution and working up the resulting solution for the separate recovery of uranium, transuranium elements and various of the fission products. For this purpose the elements have first to be separated from their envelope.

It has hitherto been universally accepted that the only method of gaining access to the uranium core of a spent fuel element is by complete removal of its envelope. For this purpose various methods have been known which depend among others upon the nature of the envelope. Thus where the envelope is of aluminium or aluminium alloy the elements are immersed into a concentrated caustic soda or caustic potash solution for the complete dissolution of the envelope.

An improved method for the dissolution of the aluminium or aluminium alloy envelope of a spent uranium fuel element is described in U.S. Patent 3,336,208, British Patent 1,037,524, French Patent 1,391,600 and German Patent 1,196,377. In accordance with that method the envelope is dissolved electrolytically. While this method is superior to the first mentioned one it is still not fully satisfactory.

For thè stripping of a zirconium or zirconium alloy envelope it is customary to dissolve the envelope with a mixture of $HNO_3$ and HF.

The conventional method for the stripping of a stainless steel envelope comprises mechanical peeling.

All the above methods for the separation of the core of a spent uranium fuel element from an envelope which are based on the removál of the envelope are not quite satisfactory. When the stripping of the envelope is by dissolution very severe conditions are required which in itself is a disadvantage from an operative point of view. The mechanical peeling requires cumbersome and expensive equipment. Moreover, because of the fact that the methods are different from each other a special plant is required for each type of element. Thus, where an atomic reactor operates on elements with different types of envelopes it requires a corresponding number of different auxiliary plants for the working up of the spent uranium fuel elements.

It is the object of the present invention to provide an improved method for the separation of the core of a spent uranium fuel element from its envelope which is universally applicable irrespective of the kind of envelope.

The invention consists in a method of separating the core of a uranium fuel element from its envelope which comprises inserting the element into a nitric acid bath whose concentration is within the range of 7–12 N, connecting the uranium core while the element is so immersed, as cathode into an electrolytic circuit, allowing electric current to flow in the electrolytic circuit until the core is sufficiently loosened from the envelope, and extracting the core from the envelope.

It has been established in accordance with the invention that during the treatment there occurs a certain dissolution of uranium so that a prior very strong adherence of the uranium core to its envelope is loosened and the core can be extracted. It has further been established that the dissolution of uranium occurs only at the contact surface of the two metals, which is exactly where it is needed, while no dissolution takes place at the exposed free ends of the element. The ends of the element are free and exposed before the element is inserted into the nitric acid bath.

The effects achieved in accordance with the invention were completely unexpected. Thus it is known that by treatment of uranium with nitric acid a certain passivation is obtained which prevents the dissolution or slows it down. The same is also achieved by the so-called cathodic protection, i.e., by connecting uranium as a cathode into an electrolytic circuit. It was therefore surprising to establish in accordance with the invention that by combining two expedients each of which by itself is antagonistic to dissolution, a dissolution of the uranium is obtained. It was further not to be expected that such dissolution would occur only at the contact surface of the uranium with the envelope while the free, exposed ends of the uranium core are not attacked at all.

The method according to the invention is universal and is applicable to all kinds of envelopes which are resistant to 7–12 N nitric acid. This is so because in the method according to the invention, as distinct from conventional methods, it is the uranium that is being attacked while the envelope remains intact.

The current density on the cathode should be above 0.01 amp./dm.$^2$ and in many cases current densities in the order of 100 amps./dm.$^2$ and higher are preferred.

The process according to the invention may be carried out at room temperature or at an elevated temperature.

The invention is illustrated by the following examples to which it is not limited.

Example 1

A fuel element comprising a pure uranium core 30 mm. in diameter and 150 mm. long and a stainless steel envelope 7 mm. thick, was immersed into an 8 N nitric acid. The uranium core was connected as cathode into an electrolytic circuit in which the anode was a platinum wire. The voltage was 10 volts and the current density on the cathode was 15 amps./dm.$^2$. After 5 hours the core was loosened sufficiently from the envelope for mechanical extraction therefrom through a free end thereof.

Example 2

A fuel element comprising a pure uranium core 30 mm.

in diameter and 150 mm. long and an aluminium (A5) envelope 80 mm. thick was immersed into an 8 N nitric acid. Uranium was connected as cathode into an electrolytic circuit in which the anode was a platinum wire. The voltage was from 6 volts and the current density on the cathode 100 amps./dm.$^2$. After 8 hours the core was sufficiently loosened from the envelope for mechanical extraction therefrom.

Example 3

A fuel element comprising a uranium-molybdenum core of the same dimension as in Example 2 and an A5 aluminium envelope 6 mm. thick was immersed into a 7 N nitric acid. The core was connected as cathode into an electrolytic circuit in which the anode was a platinum wire. The voltage was 8 volts and the current density on the cathode 120 amps./dm.$^2$. After 10 hours the core was sufficiently loosened from the envelope for mechanical extraction therefrom.

Example 4

A fuel element comprising a pure uranium core measuring 25 mm. in diameter and 150 mm. in length and having a Zircaloy-2 envelope 7 mm. thick was immersed into 9 N nitric acid. The core was connected as cathode into an electrolytic circuit in which the anode was a platinum wire. The voltage was 10 volts, the current density on the cathode 200 amps./dm.$^2$. After 6 hours the core was sufficiently loosened from the envelope for mechanical extraction therefrom.

Example 5

A fuel element comprising a uranium-molybdenum core having the same dimensions as that of Example 4 and a 7 mm. thick Zircaloy envelope was immersed into an 8 N nitric acid bath. The core was connected as cathode into an electrolytic circuit in which the anode was a platinum wire. The voltage was 10 volts and the current density on the cathode 200 amps./dm.$^2$. After 8 hours the core was sufficiently loosened from the envelope for mechanical extraction therefrom.

We claim:
1. A method of separating the core of a uranium fuel element from its metallic envelope which surrounds the core with an end thereof exposed, which metallic envelope is resistant to attack by 7–12 N nitric acid which comprises inserting the element into a nitric acid bath whose concentration is within the range of 7 to 12 N, connecting the uranium core while the element is so immersed as cathode into an electrolytic circuit, allowing electric current to flow in the electrolytic circuit until the core is sufficiently loosened from the envelope due to dissolution of the uranium at the contact surface between the uranium and the envelope metal, and extracting the core from the envelope.

2. A method according to claim 1 wherein the envelope metal is selected from the group consisting of aluminium, aluminum alloys, zirconium, zirconium alloys and stainless steel.

3. A method according to claim 1 wherein a current density on the cathode of 0.01 to the order of 200 amps./dm.$^2$ is utilized.

References Cited

Electrolytic Dissolution of Stainless Steel by H. E. Henry, July 1959.
A.E.C. Research & Development Report, E. I. du Pont de Nemours & Co., pp. 3–8.

REUBEN EPSTEIN, *Primary Examiner.*

U.S. Cl. X.R.

204—146